Nov. 25, 1941.   W. A. BARROWS   2,263,560
TRAP
Filed Aug. 14, 1939
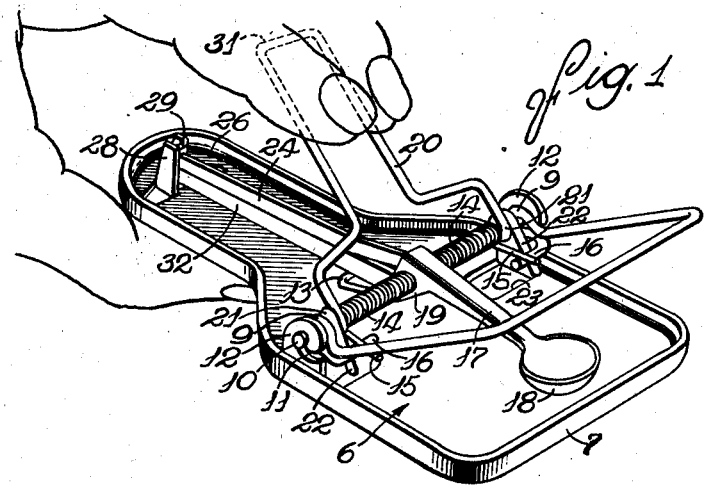
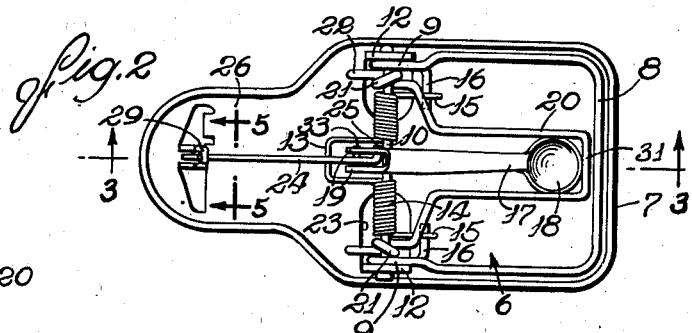
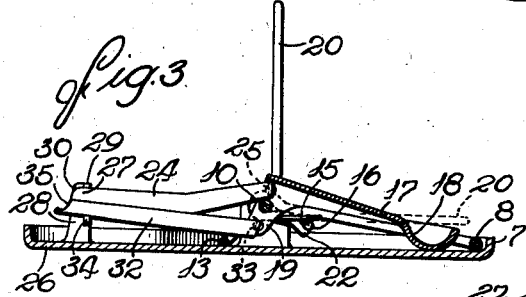
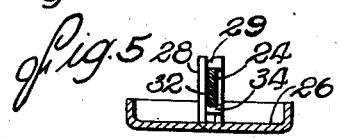
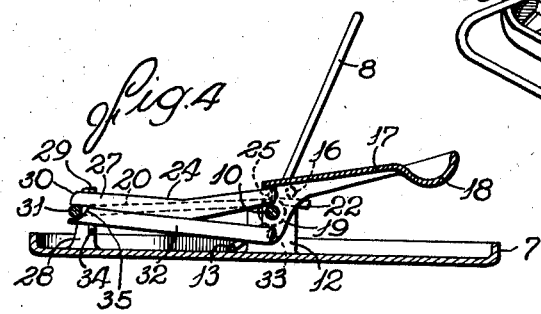
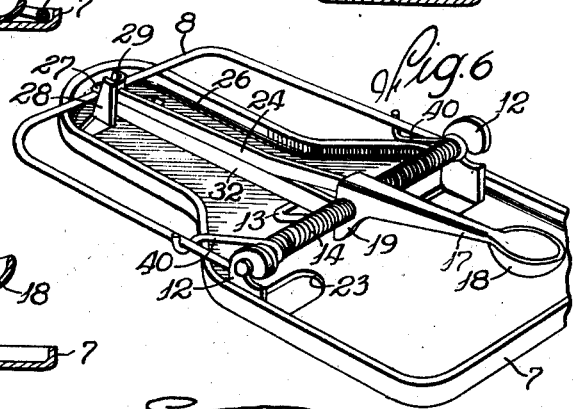
INVENTOR
Walter A. Barrows,
By Parker, Carlson, Pitzner & Hubbard
ATTORNEYS Patented Nov. 25, 1941

2,263,560

UNITED STATES PATENT OFFICE 2,263,560

TRAP

Walter A. Barrows, Belvidere, Ill.

Application August 14, 1939, Serial No. 289,961

10 Claims. (Cl. 43—83.5)

This invention relates to animal traps of the type which may be set without the necessity of manually raising the bait holder during setting of the trap.

The general object is to provide an animal trap which is reliable in operation, which is safe and easy to set, which facilitates the removal of a caught animal without the necessity of touching the jaw by which the animal is held, and which is so simple in construction and readily assembled that it can be manufactured at a low cost.

Another object is to provide a novel latch mechanism and means for actuating the latter during setting of the trap.

A further object is to provide for automatic setting of the trap jaw and release of a caught animal simply by the depression of a pivoted part arranged to be collapsed on the trap base to provide compactness during shipment.

The invention also resides in the novel construction of the parts which facilitates assembly and contributes to the low manufacturing cost.

Other objects and advantages of the invention will become apparent from the following detailed description taken in connection with the accompanying drawing, in which Figure 1 is a perspective view of the improved trap illustrating the manner of setting the same.

Fig. 2 is a plan view with the parts released and collapsed for packing.

Figs. 3 and 4 are cross-sectional views taken along the line 3—3 of Fig. 2 showing different positions of the parts.

Fig. 5 is a section taken along the line 5—5 of Fig. 2.

Fig. 6 is a perspective view of a modification.

While the invention is susceptible of various modifications and alternative constructions, I have shown in the drawing and will herein describe in detail the preferred embodiments. It is to be understood, however, that I do not intend to limit the invention by such disclosure but aim to cover all modifications and alternative constructions falling within the spirit and scope of the invention as expressed in the appended claims.

The trap shown for purposes of illustration includes a sheet metal base 6 of the proper rigidity having a substantially square end 7 coacting with a spring actuated jaw 8 to hold a caught animal. The jaw is a square U-shape piece of wire looped as indicated at 9 around a pin 10 which is seated in openings 11 in lugs 12 struck up from the base on opposite sides of the latter. A piece of spring wire bearing at its center 13 against the base winds around the pin 10 to form two coils 14 the outer ends 15 of which bear downwardly against the inturned ends 16 of the jaw wire. The springs thus act to swing the jaw toward the base with a force sufficient to hold a caught animal. One or both of the lugs 12 are slotted to facilitate mounting of the pin 10.

Hinged on the pin between the springs 14 is an arm 17 projecting toward but short of the closed end of the jaw 8 and carrying a bait holder 18 of any preferred construction. Preferably, the arm is formed from sheet metal and has two spaced flanges 19 through which the pintle 10 extends.

In the preferred construction, the jaw is disposed substantially in upright position (Fig. 4) when the trap is set and is held in this position by a latch mechanism coacting in a novel manner with a member hinged on the pin 10 for movement relative to the jaw when the trap is not in use. In the present instance, said member comprises a wire bail 20 narrower and shorter than the jaw wire and flared at its open end which is formed with loops 21 encircling the pin. The ends 22 of this bail are adapted to engage beneath the inturned ends 16 of the jaw wire so that when the closed end of the bail is depressed from position shown in Figs. 1 and 3 to that of Fig. 4, the jaw is swung upwardly into set position. A one-way bearing connection is thus provided between the jaw and bail permitting the bail to be swung reversely relative to the jaw and base and collapsed onto the latter within the jaw as shown in Fig. 2 and in dotted outline in Fig. 3. During such movement of the bail, the ends may move through openings 23 formed by striking the lugs 12 from the base.

A latch responsive to the movements of the bait holder coacts with the bail 20 to hold the jaw in set position. Herein, the latch takes the form of a substantially straight bar 24 pivotally connected at 25 in any suitable way with one flange 19 of the bait arm, and projecting toward the other end 26 of the base which may, if desired, be of reduced width as shown. The free or active end 27 of the latch bar is guided between two posts 28 preferably struck up from the base, one providing a stop 29 overlying the latch bar end 27 the upper surface of which is rounded as indicated at 30. The pivot 25 is disposed above the pivotal axis of the bait arm so that raising of this arm will project the end 27 of the latch rearwardly to active position (Fig. 4) overlying the closed end 31 of the bail 20. For the same reason, depression of the bait holder will retract the latch and release the bail to the action of the springs.

Means is provided for raising the bait holder and moving the latch bar into active position automatically in response to depression of the bail 20. The means shown for this purpose comprises a link 32 disposed below the latch bar 24 and pivotally connected to the same flange 19 of the bait arm at a point 33 disposed below the pivot pin 10. The other end of the link is guided between the posts 28 and rests on a lug 34. On its rear end, the link is formed with a cam surface 35 which slopes downwardly and outwardly from a point immediately behind the posts 28 disposed in the path of the closed end 31 of the bail as the latter is depressed below the latch bar. The inclination of the surface 35 is such that link 32 is cammed endwise by the bail 20 as the latter is depressed.

To provide compactness for packing and shipping, the bail 20 is swung clockwise relative to the base and jaw 8 down to a position adjacent the base where it nests within the jaw as shown in Fig. 2 and in dotted outline in Fig. 3. With the parts thus collapsed together, the trap is substantially flat.

To set the trap, the bail 20 is swung upwardly from its collapsed position, the parts then being positioned as shown in Fig. 3. The base 6 is grasped at the sides with one hand, and the thumb of the other hand is placed beneath the narrowed end 26 of the base. Then, the bail 20 is depressed by the fore and middle fingers as illustrated in Fig. 1. As the closed end 31 of the bail moves below the latch and encounters and moves along the cam surface 35, the link 32 is projected endwise toward the pivot pin. Since the pivot 33 is disposed below the pin 10, the bait arm 17 will be raised as shown in Fig. 4 as an incident to which the latch 24 is, due to the location of its pivot 25 above the pin 10, moved in the reverse direction so that its rear end 27 is projected above the end 31 of the bail. In order to move the latch far enough to catch the bail end 31 upon release of the latter, the bail must be depressed to a position somewhat below the end of the latch bar and then released quite rapidly. Thus, in the set position, the cam surface 35 is ordinarily disposed out of contact with the bail so that the cam does not in any way interfere with the withdrawal of the latch to trip the bail. The latter is thus caught and held by the latch as the pressure is released, the jaw 8 being then held in the upright position (Fig. 4) by the ends 22 of the bail acting on the jaw ends 16 and against the action of the springs.

When the holder 18 is depressed, by an animal attempting to remove bait therefrom, the latch is retracted, tripping the bail so as to release the jaw to the action of the springs 14. The jaw is snapped downwardly against the animal.

To release the animal from the trap, it is unnecessary to touch it or any part of the jaw 8. This is accomplished simply by pinching the bail 20 and the smaller end of the base together with one hand thus swinging the jaw far enough to allow the caught animal to drop out.

By virtue of the simple latch and cam bar arrangement above described, it will be observed that the bait holder is raised positively by cam action as an incident to depression of the bail 20. The weight of the bait or position of the trap in no way influences the ease with which the trap may be set. Moreover, all of the movable parts, including the jaw 8, the springs, the bail 20, and the bars 24 and 32, may be preassembled as a unit that can readily be mounted on the base. To further reduce assembly costs, the stop lug 29 may be formed with a curved upper surface (Fig. 5) which enables the bars 24 and 32 to be forced down between the one post, and the lug into proper position, one above the other, between the posts. Finally the latter may be closed together.

The bail 20 may be omitted, if desired, and provision made for engagement of the latch 24 directly with the center of the jaw 8. In this form of trap shown in Fig. 6, the free ends 40 of the springs 14 are hooked around the jaw proper and the base, and the latch and cam bars are lengthened so that the wire jaw will engage the cam surface 35, raise the bait arm, and project the latch into active position in the description in connection with the preferred form of the invention.

I claim as my invention:

1. An animal trap comprising a base, a bait arm pivoted on said base above the latter, a spring actuated bail pivoted on said base and swingable to a set position adjacent the base, means including a member engaged by said bail during depression and setting thereof and connected to said arm so as to elevate the bait on said arm, and a latch separate from said member and positively moved by movement of said arm to a position overlying said bail for engagement therewith and adapted to be released from the bail by depression of said bait arm.

2. An animal trap comprising a base, a bait arm pivoted on said base, a spring actuated bail, a cam bar connected at one end to said arm below the pivot of the latter and shifted endwise by engagement with said bail upon depression of the latter toward said base whereby to elevate the bait on said arm, and a latch bar extending alongside said cam bar and connected to said arm above said pivot, the free end of said latch bar being projected to a position overlying said bail by the raising of said arm through the medium of said cam bar.

3. An animal trap comprising a base, a bait arm pivoted on said base above the latter, a bail pivoted on said base and spring urged toward said bait arm, a cam bar connected at one end to said arm below the pivot of the latter and shifted endwise by engagement with said bail upon depression of the latter toward said base whereby to elevate the bait on said arm, and a latch member actuated by movement of said bar and to a position overlying said bail and adapted to be released from the bail by depression of said bait arm.

4. An animal trap comprising a base, a spring actuated jaw pivoted on said base, a bait arm pivoted on said base and projecting therealong in one direction, a pair of bars projecting along the base in the opposite direction and associated at one of their ends with said arm so as to be shifted endwise in opposite directions during raising or lowering of the arm, posts upstanding from said base and guiding the other ends of said arms, one of said other ends having a cam surface operable during movement of said jaw to set position to raise said arm, the end of the other bar constituting a latch for maintaining said jaw in set position and being moved to active position during raising of said arm and released by lowering of the arm.

5. An animal trap comprising a base, a spring actuated jaw pivoted on said base, a bait arm adjacent said jaw and pivoted on said base, and two bars mounted on said base and movable bodily and endwise in opposite directions relative to each other during raising and lowering of said arm, one of said bars constituting a latch for engaging and releasably holding said jaw in set position, said other bar being engaged by and actuated in the movement of said jaw to set position and operating to raise said arm.

6. An animal trap having, in combination, a base, a pivot pin disposed above and supported by said base, a jaw comprising a U-shaped piece of wire having end portions looped around said pin and ends bent laterally, a spring coiled around said pin and bearing downwardly on said ends to swing the jaw down against said base, and a wire bail having end portions looped around said pin and projecting beneath said ends whereby said jaw may be swung upwardly away from said base by swinging said bail downwardly toward the base, said bail being swingable reversely relative to said jaw to a position adjacent the plane of the latter.

7. An animal trap having, in combination, a base, a pivot pin disposed above and supported by said base, a jaw comprising a U-shaped piece of wire having portions looped around said pin and the ends bent laterally, a spring coiled around said pin and bearing downwardly on said ends to swing the jaw down against said base, a wire bail having end portions looped around said pin and projecting beneath said ends whereby to provide a one-way connection by which said jaw may be raised to set position above one end of the base by swinging said bail down adjacent the other end of the base, a latch engageable with the closed end of said bail to hold the jaw set, and means operating automatically as an incident to depression of said bail in setting said jaw to move said latch into active set position whereby the trap may be set simply by manual depression of said bail.

8. An animal trap having, in combination, a base, a spring actuated jaw pivoted on said base and swingable down against one end thereof, a bait arm hinged on the base, a member hinged on said base and having a one-way connection with said jaw by which the jaw may be raised to set position away from one end of the base by depression of said member to a position adjacent the other end of the base, a latch actuated by said bait arm and movable into and out of engagement with said member to hold and release the member and said jaw, and means engageable with said member upon depression thereof to shift said bait arm and latch into active position.

9. An animal trap having, in combination, a base, a spring actuated jaw pivoted on said base and swingable down against one end thereof, a bait arm hinged on the base, a member hinged on said base and having a one-way connection with said jaw by which the jaw may be raised to set position away from one end of the base by depression of said member to a position adjacent the other end of the base, a latch actuated by said bait arm and movable into and out of engagement with said member to hold and release the member and said jaw, and a bar engageable with said member upon depression thereof below said latch and operatively connected with said bait arm to cause the latch to be shifted to active position.

10. An animal trap comprising a base, a spring actuated jaw pivoted on said base, a bait arm adjacent said jaw and pivoted on said base, and two bars pivoted on said bait arm and supported by said base for bodily endwise movement in opposite directions relative to each other during raising and lowering of said arm, one of said bars constituting a latch for releasably holding said jaw in set position, said other bar being actuated in the movement of said jaw to set position and operating to raise said arm.

WALTER A. BARROWS.